United States Patent [19]

Levene et al.

[11] Patent Number: 5,665,224
[45] Date of Patent: Sep. 9, 1997

[54] FILTER JUG

[75] Inventors: Michael Levene, Middlesex; Nick Oakley, London, both of Great Britain

[73] Assignee: William Levine Limited, Middlesex, Great Britain

[21] Appl. No.: 387,862
[22] PCT Filed: Aug. 9, 1993
[86] PCT No.: PCT/GB93/01685
    § 371 Date: Apr. 12, 1995
    § 102(e) Date: Apr. 12, 1995
[87] PCT Pub. No.: WO94/04245
    PCT Pub. Date: Mar. 3, 1994

[30] Foreign Application Priority Data

Aug. 14, 1992 [GB] United Kingdom .................. 9217318
Apr. 8, 1993 [GB] United Kingdom .................. 9306303

[51] Int. Cl.⁶ ........................................... B01D 27/08
[52] U.S. Cl. ........................... 210/85; 210/282; 210/472; 210/484
[58] Field of Search ........................... 210/282, 350, 210/484, 473, 85, 472

[56] References Cited

U.S. PATENT DOCUMENTS

| | | | |
|---|---|---|---|
| 2,087,157 | 7/1937 | Lind | 210/282 |
| 2,304,453 | 12/1942 | Gudmundsen | 210/282 |
| 2,749,307 | 6/1956 | Ellison | 210/282 |
| 4,094,779 | 6/1978 | Behrman | 210/282 |
| 4,605,499 | 8/1986 | Wise | 210/282 |
| 4,969,996 | 11/1990 | Hankammer | 210/282 |
| 5,002,665 | 3/1991 | Brueggermann | 210/266 |
| 5,049,272 | 9/1991 | Nieweg | 210/266 |
| 5,186,830 | 2/1993 | Rait | 210/282 |
| 5,190,643 | 3/1993 | Duncan et al. | 210/473 |

FOREIGN PATENT DOCUMENTS

| | | |
|---|---|---|
| 0285908 | 10/1988 | European Pat. Off. . |
| 0335066 | 10/1989 | European Pat. Off. . |
| 0349315 | 1/1990 | European Pat. Off. . |
| 60-220115 | 11/1985 | Japan . |
| 81209846 | 7/1992 | Taiwan . |
| 606923 | 8/1948 | United Kingdom . |
| 654012 | 5/1951 | United Kingdom . |
| 712035 | 7/1954 | United Kingdom . |
| 2192808 | 1/1988 | United Kingdom . |
| 2197647 | 5/1988 | United Kingdom . |
| 2255771 | 11/1992 | United Kingdom . |

Primary Examiner—Ivars Cintins
Attorney, Agent, or Firm—Caesar, Rivise, Bernstein, Cohen & Pokotilow

[57] ABSTRACT

A filter jug to contain water or other liquid, the jug comprising a first compartment to receive liquid and a second compartment to hold filter liquid to be poured from an outlet of the second compartment and a filter chamber through which liquid must pass from the first compartment to the second compartment.

13 Claims, 4 Drawing Sheets

FILTER JUG

This invention relates to a filter jug of the type which includes a water filter medium and to a container for the filter medium to be used in the jug. Such jugs are filled with water, e.g. from a domestic tap and the water is passed through via the filter medium so as to improve the quality of the water for drinking. The filter medium is typically housed in a moulded canister having perforations for the passage of water therethrough, the canister being received in a suitably shaped chamber. The filter medium needs to be replaced periodically and the used filter in its canister must be discarded.

GB-A-606923 discloses a portable filter unit comprising a container of pervious fabric having an upper compartment for the impure water and a lower compartment for the filtered water, the compartments being separated by a filter through which the water flows. GB-A-654012 discloses a filtering device comprising a reservoir for filtered liquid, an inner perforated cage within the reservoir and a removable container of granulated filter medium inside the cage. GB-A-712035 discloses a filtering device in the form of a beaker having a permeable base and a packing of active carbon between two perforated surfaces located near the base. GB-A-2192808 discloses a filter to remove impurities from water to transport live fish. The filter comprises a column with an inlet near the base and an outlet near the top, the column containing arcuate apertured channels containing sausage-like filter bags containing particulate filtration medium. U.S. Pat. No. 4,094,779 discloses a filtration system utilising an inverted upper chamber mounted on a stand above a lower chamber, a filter containing active carbon being disposed between the two filters. U.S. Pat. No. 4,605,499 discloses a filter unit comprising a pouch containing filter medium and means to suspend the pouch in the mouth of the container to receive water.

EP-A-0349315 discloses a filter cartridge for a liquid purifier, comprising a cup like container having a depending baffle. In use liquid passing through the cover flows downwardly inside the baffle, passing through liquid treatment medium with which the cartridge is filled, and then upwardly between the outside of the baffle and the container wall. EP-A-0285908 discloses a container to purify water having a receiving chamber containing a filter cartridge filled with purifying agent, the cartridge having a foil closure that is pierced by a projection in the chamber.

There remains a need for an efficient filter jug that can be easily used and maintained and which includes a filter element which is efficient in use and can be discarded in an environmentally acceptable way.

According to the one aspect of the invention, there is provided a filter jug to contain water or other liquid, the jug comprising a first compartment to receive liquid from a supply, a second compartment to hold filtered liquid to be poured from an outlet of the second compartment and a filter chamber through which liquid must pass from the first compartment to the second compartment, the filter chamber having a removable lid with a projection extending into the chamber and the chamber containing a filter medium, characterised in that the filter medium is present in a flexible bag having a liquid-pervious wall and that the projection of the removable lid of the filter chamber is shaped and dimensioned to extend into the chamber to urge the flexible bag against the walls of the chamber so as to eliminate air gaps through which water could bypass the filter medium in the bag.

Preferably the bag 5A is made of textile or synthetic material throughout so that the bag can be inserted in the chamber in any orientation.

In a preferred feature, the falter chamber includes deformations to engage or support the flexible bag. In a preferred embodiment the chamber includes a removable wall, typically the top, and having a projection extending into the chamber and shaped to urge the flexible bag against the other walls of the chamber so that there are no gaps through which liquid can bypass the filter medium.

Preferably, the filter medium B adapted to remove solids and/or gases from the liquid to be treated.

In a particularly preferred feature the first compartment is a removable inner housing dimensioned for reception in the upper part of the second compartment. Preferably, the filter chamber depends from the underside of the first compartment.

In another aspect the invention provides a container containing a particulate filter medium for use in a filter jug characterised in that the container comprises a flexible bag having a wall of liquid-pervious material.

Advantageously, the bag is formed from a single blank of substantially rectangular form which has been folded along the transverse centre axis and sealed along its margins and at its overlapping edges whereby only a single transverse seal is formed so that the flexible bag may be compacted in a filter chamber without overlapping wall portions of the bag which would restrict access of the liquid to the contained filter medium.

In a much preferred feature, means are present to record the usage of the filer medium or the passage of time since the filter medium was installed. Preferably, the means comprises a marked rotary wheel mounted on a lid for the jug.

In order that the invention may be well understood it will now be described by way of example with reference to the accompanying diagrammatic drawings, in which.

The same reference numerals are used to describe the same parts of the different embodiments.

Figure 1:
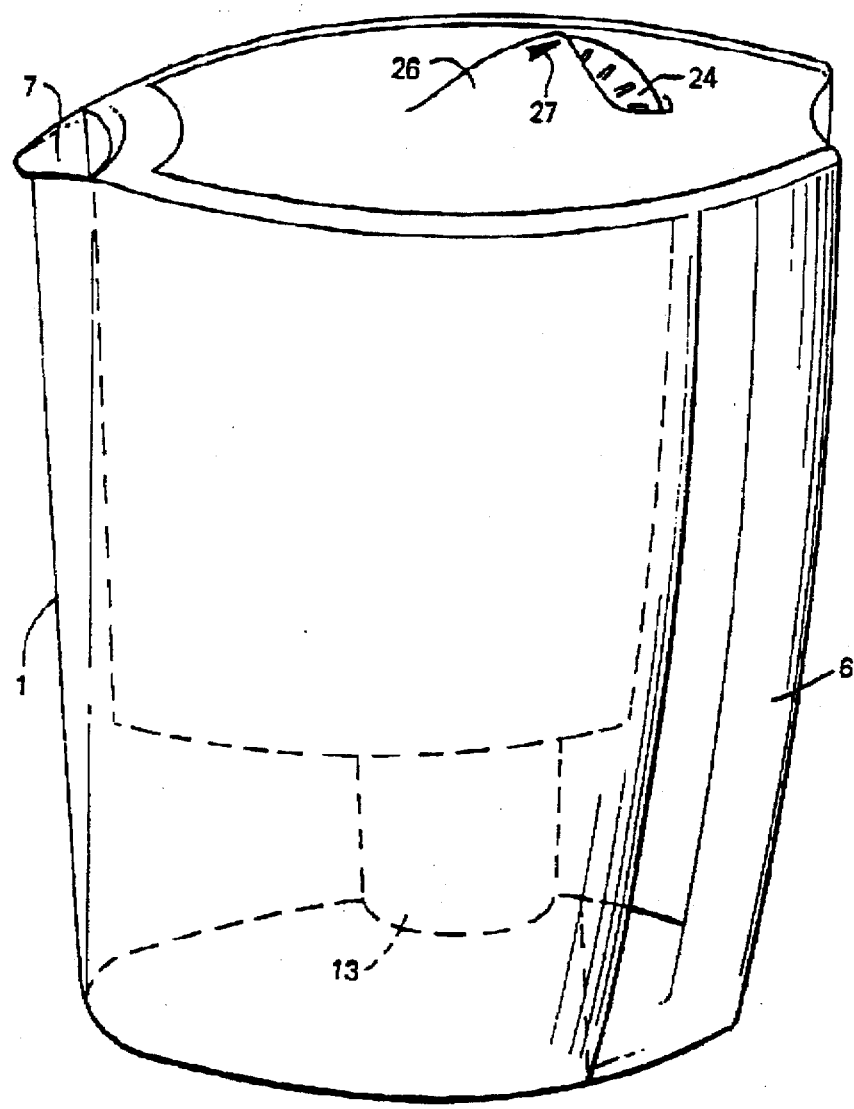
FIG. 1 is a side elevation of the container in assembled condition.
Figure 3:
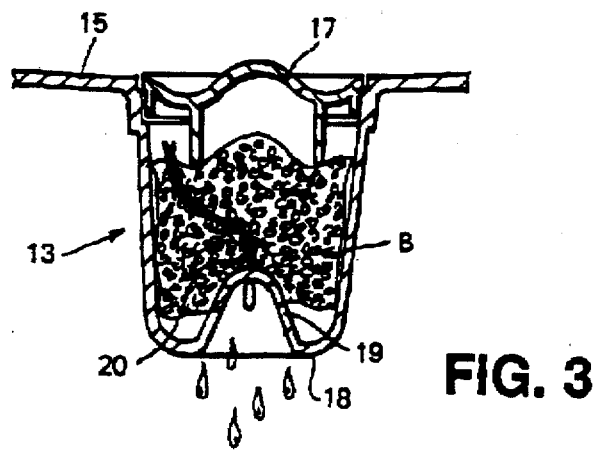
FIG. 3 is a side elevation, partly in section, of the area marked III on FIG. 2.

The container comprises a juglike main housing 1. The housing is of rounded triangular shape as seen in plan, having a front wall 2 and a rear wall 3. The housing forms the second compartment of the jug. A top extension 4 and a parallel bottom extension 5 project from the rear wall 3 on to which the sides of a handle 6 can be engaged. The top of the front wall of housing 1 defines a spout 7. An inner housing 8 forms the first compartment and comprises a body of substantially the same shape as the main housing, but of relatively reduced height, having a flat front fabric at the top of which is a flat ledge 10 having a concavely curved edge 11 which in co-operation with the spout 7 defines an outlet. The top of the inner housing 8 has side shoulders 12. The upper periphery of compartment 8 engages the upper periphery of compartment 1 when the former is positioned in the latter.

Figure 2:
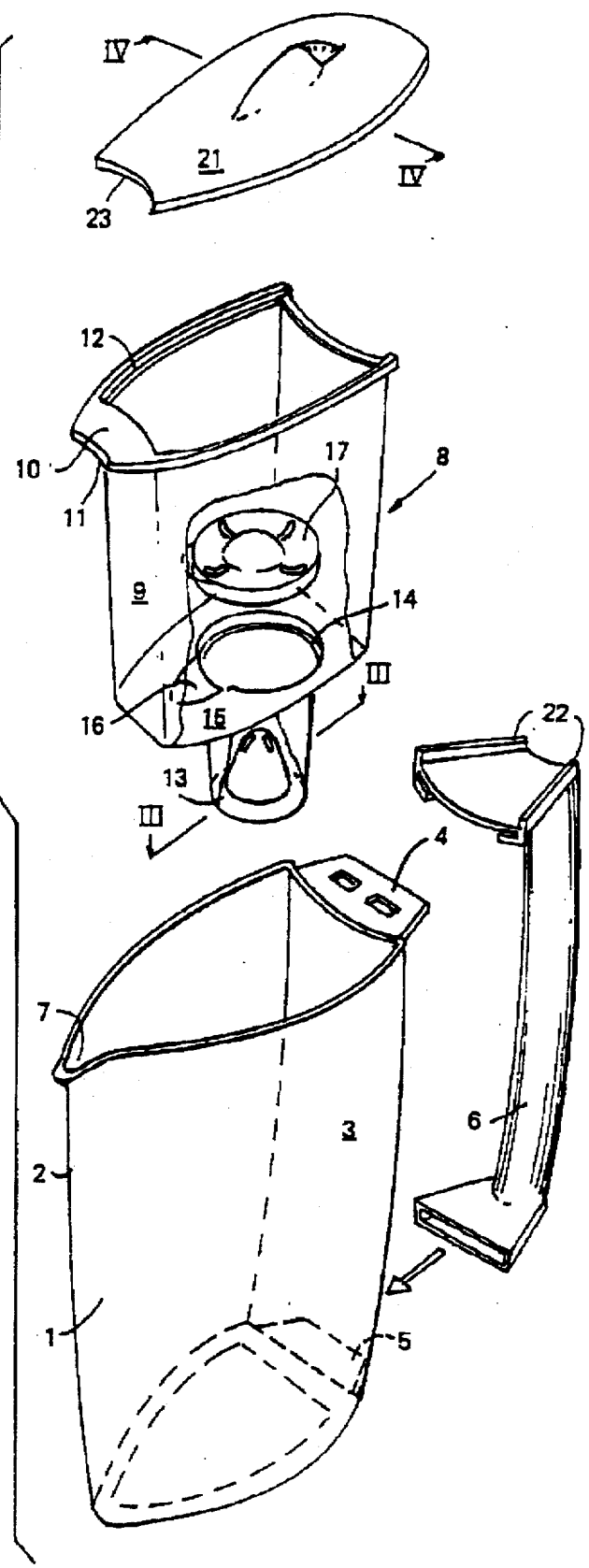
FIG. 2 is an exploded perspective view of the container of FIG. 1.

A cylindrical extension 13 depends below a hole 14 in the floor 15 of the inner housing and defines a filter chamber or sump. As can be seen in FIG. 2, the floor 15 has a depression 16 in the region of the hole 14, and a disc shaped lid 17 is present to fit over the hole. The floor 18 of the extension 13 has an upwardly-extending frustoconical column 19 in the top of which are holes 20. The extension 13 thus defines a chamber having a perforate region in its floor, adapted to receive a sealed flexible bag B containing a filter treatment agent. The bag has a water-pervious wall made of textile or like material resembling a tea bag, and contains say charcoal or like water treatment agent. The bag is sealed by a so called transwrap seal the effect of which is to avoid excess wall material.

A lid 21 is dimensioned to fit over the main housing 1 by engaging the shoulders 12 on the inner housing and aligned shoulders 22 on the handle 6. The lid 21 has a concave front wall 23, leaving an open area to overlie the spout 7.

Figure 4:
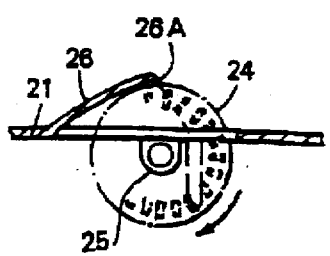
FIG. 4 is a side elevation, partly in section, of the area marked IV on FIG. 2.

A wheel 24 is mounted on an axle 25 (FIG. 4) below the lid. A shroud 26 is present on top of the lid, dimensioned so that only part of the wheel is exposed. The wheel is marked with numerals 1 to 31, corresponding to the maximum days in the month, and is used to indicate, in co-operation with a marker 26A on the shroud the day in the month which the treatment agent was last replaced. (The agent should usually be replaced monthly).

To add the treatment agent B the lid 21 and 17 are removed, the bag B dropped in the chamber and lid 17 is replaced. Water is then run in through the housings to flush the system through. The maker is then set to the date. The jug is filled with water from the usual kitchen tap and then lid 21 is replaced. Because the inner housing 8 and the chamber 13 are relatively wide there is no delay in filling water and trapped air can escape via the passageway between the main housing 1 and the inner housing 8 and the spout 7. The jug can then be stored in the refrigerator. When after multiple fillings of the jug the bag B needs to be discarded, it is simple to do so, and there is no environmental problem in that the wall of the bag will decompose and the charcoal is not harmful. The amount of waste is negligible.

Figure 6:
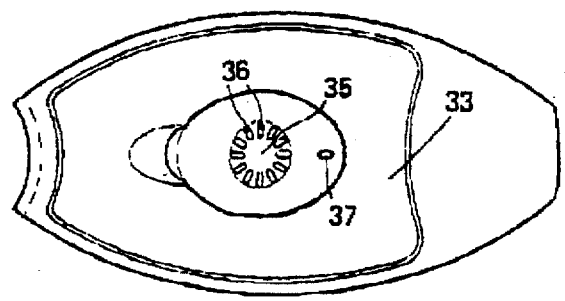
FIG. 6 is a plan view of the lid of the filter chamber of FIG. 5.
Figure 5:
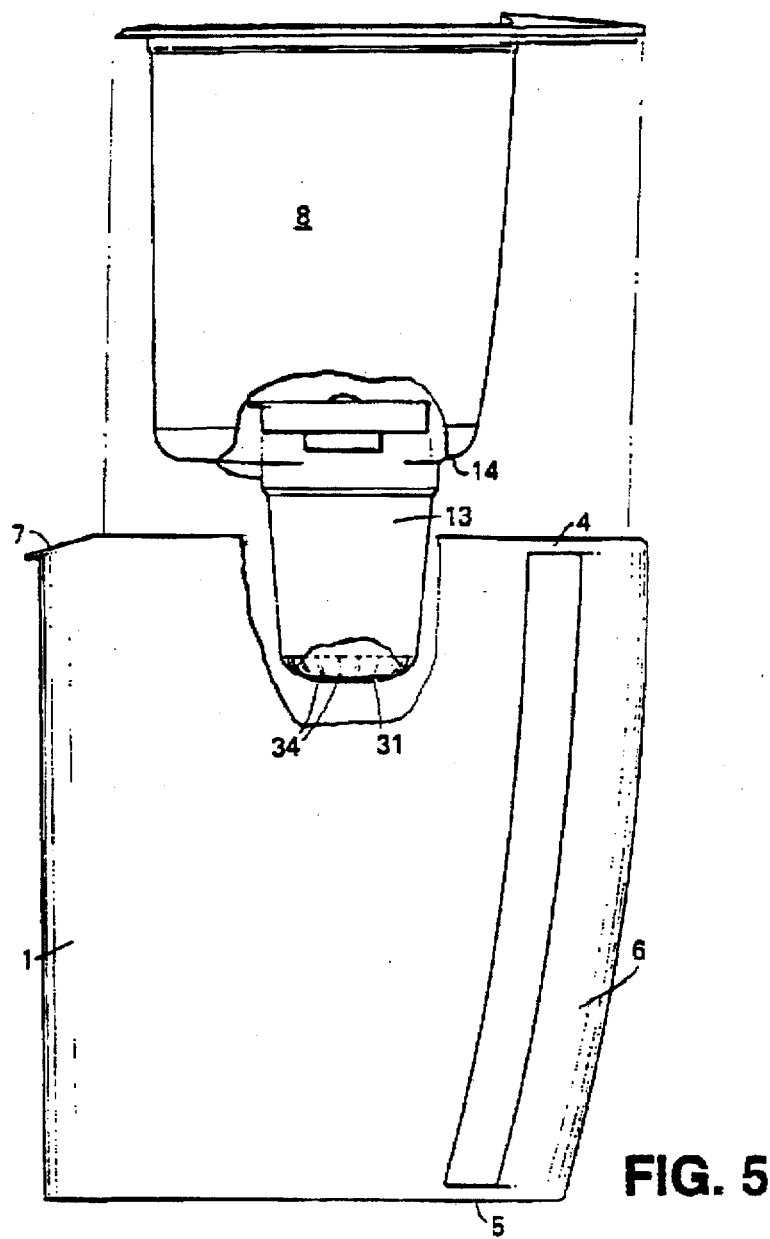
FIG. 5 is a partial exploded view of another embodiment of the invention.
Figure 7:
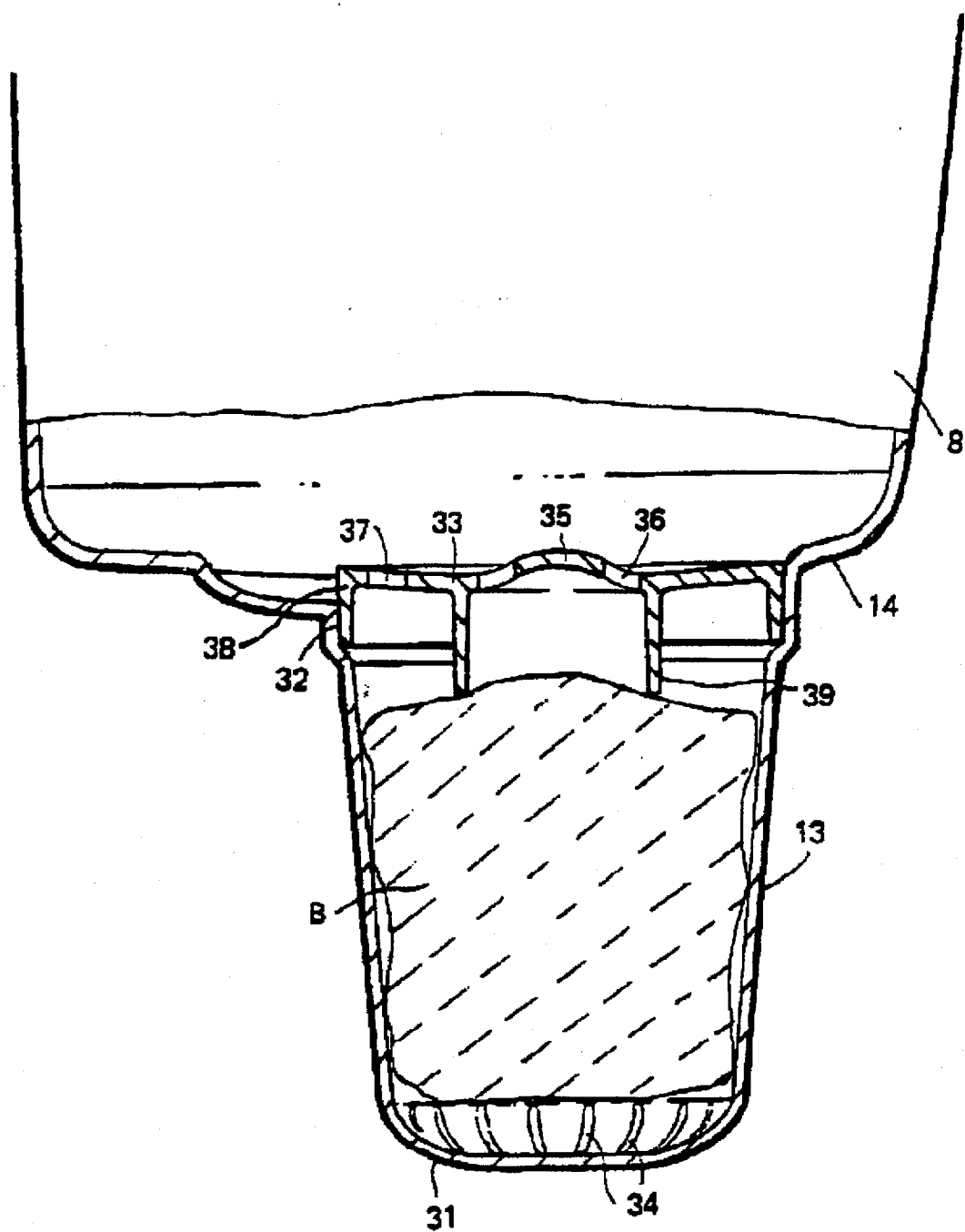
FIG. 7 is a vertical sectional elevation of the filter chamber of the embodiment of FIG. 5.

In the embodiment of FIGS. 5 to 7 the filter jug comprises a second compartment 1 which is the main housing of the jug. It is of generally oval plan shape and has the same basic plan shape as that of the inner housing first compartment 8 (see FIG. 5) and is a little larger to receive the first compartment 8.

The upper rim of the compartment 1 defines the spout 7 and has an outward rear top projection 4 which is joined to a corresponding rear bottom projection 5 by handle 6.

An integrally formed filter chamber 13 depends from the floor 14 of the inner housing 8. Chamber 13 has a generally cylindrical wall tapering towards its base 31 and defines at its upper end an annular shoulder 32 to receive a lid 33 to be described below. The base 31 has a number of perforations 34 to allow liquid to pass out of the chamber. A flexible sealed bag B containing filter medium can be placed in chamber 13. The lid 33 is of generally oval shape and has a central hump 35 surrounding by perforations 36 to allow liquid to pass through into the chamber 13. An air hole 37 is also provided to aid water flow. The lid 33 has an annular depending peripheral flange 38 which extends into the chamber 13 and locates around shoulder 32 when the lid is in position. An annular projection 39 depends from the underside of the lid 33 to urge the flexible filter bag B into contact with the inner wall of chamber 13 (see FIG. 7) until there are no air gaps through which water can bypass the filter medium, e.g. charcoal, in the filter bag B.

This embodiment is used in the same way as the first. In this case the wheel is marked with an arrow of increasing width and is moved each time the jug is filled, and when the arrow disappears from view (because of the shroud) the user realises the bag B needs to be replaced.

The invention is not limited to the embodiment shown. A spout need not be present so that the jug is like a bottle. A handle may be present on the lid 33 to ease removal. The bag B can be used in jugs of a shape different from that shown. The filter chamber my be a detachable component of the jug.

We claim:

1. A filter jug to contain water or other liquid, the jug comprising a first compartment to receive liquid from a supply, a second compartment to hold filtered liquid to be poured from an outlet of the second compartment and a filter chamber through which liquid must pass from the first compartment to the second compartment, the filter chamber having a removable lid with a projection extending into the chamber and the chamber containing a filter medium, the filter medium being present in a flexible bag having a liquid-pervious wall and the projection of the removable lid of the filter chamber being shaped and dimensioned to extend into the chamber to urge the flexible bag against the walls of the chamber so as to eliminate air gaps through which water could bypass the filter medium in the bag.

2. A jug according to claim 1, in which the first compartment is a removable inner housing dimensioned for reception in the upper part of the second compartment.

3. A jug according to claim 2 in which the first compartment is of substantially the same shape as the second compartment and the upper periphery of the first compartment engages the upper periphery of the second compartment.

4. A jug according to claim 1, in which the flexible bag has a wall formed of textile or synthetic material.

5. A jug according to claim 1, in which the lid of the chamber includes a hole for the escape of entrapped air.

6. A jug according to claim 1 in which the filter chamber includes a perforated wall portion for the ingress of water to be filtered and another for the egress of filtered water.

7. A jug according to claim 1, in which the filter chamber depends from the underside of the first compartment.

8. A jug according to claim 1, in which the outlet communicates with a passageway defined by a clearance between the first compartment and the facing wall of the second compartment.

9. A jug according to claim 1, in which the filter medium is adapted to remove solids or gases from the liquid to be treated.

10. A jug according to claim 1, in which means are present to record the date when the filter bag was installed.

11. A jug according to claim 10, in which said means present to record the usage of the jug include calendar dates.

12. A jug according to claim 10, in which the record means are mounted on a lid for the jug.

13. A jug according to claim 1, which the flexible bag is formed from a single blank of liquid pervious material and of substantially rectangular form which has been folded along the transverse center axis and sealed along its margins and at its overlapping edges whereby only a single transverse seal is formed so that the flexible bag may be compacted in said filter chamber without overlapping wall portions of the bag which would restrict access to the contained filter medium.

\* \* \* \* \*